US004001668B2

United States Statutory Invention Registration [19]

[11] Reg. Number: H1668

Paciorek et al.

[45] Published: Jul. 1, 1997

[54] POLYMERIC PERFLUOROALKYLETHER-LINKED QUINOXALINES

[75] Inventors: Kazimiera J. L. Paciorek, Corona del Mar; Steven R. Masuda; Wen-Huey Lin, both of Laguna Niguel, all of Calif.; William M. Warner, Riverside, Ohio

[73] Assignee: The United States of America as represented by the Secretary of the Air Force, Washington, D.C.

[21] Appl. No.: 586,532

[22] Filed: Jan. 16, 1996

[51] Int. Cl.[6] ..... C08G 12/00

[52] U.S. Cl. ..... 528/125

[58] Field of Search ..... 528/125, 229, 528/394, 401

[56] References Cited

U.S. PATENT DOCUMENTS

| | | | |
|---|---|---|---|
| 3,966,729 | 6/1976 | Kovar et al. | 260/250 Q |
| 3,975,444 | 8/1976 | Kovar et al. | 260/571 |
| 4,005,144 | 1/1977 | Kovar et al. | 260/578 |
| 4,667,002 | 5/1987 | Unroe et al. | 526/259 |
| 4,683,309 | 7/1987 | Unroe et al. | 544/353 |

OTHER PUBLICATIONS

K.J.L. Paciorek, S.R. Masuda, J.G. Smith, J.G. Shih and J.H. Nakahara, "The Synthesis of Perfluoroalkyl and Perfluoroalkylether Substituted Benzils", Journal of Fluorine Chemistry, vol. 53, No. 2 (1991), pp. 233–248 (Jul. 1991).

*Primary Examiner*—Charles T. Jordan
*Assistant Examiner*—Meena Chelliah
*Attorney, Agent, or Firm*—Charles E. Bricker; Thomas L. Kundert

[57] ABSTRACT

Perfluoroalkylether-linked quinoxalines having repeating units of the formula:

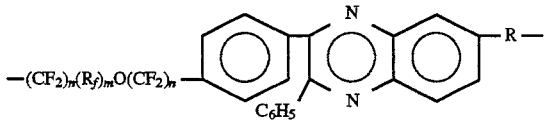

-continued

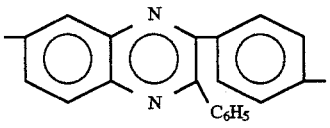

wherein $R_f$ is selected from the group consisting of —$OCF_2CF_2$—, —$OCF_2CF_2CF_2$—, —$OCF_2CF_2CF_2CF_2$—, —$OCF_2CF(CF_3)$— and —$OCF_2CF_2OCF_2CF(CF_3)$—; wherein n has a value of 2 to 4, and m has a value of 1 to 20; and wherein R is a single bond, —O—, —S—, —$C_6H_4$—O—$C_6H_4$—, or —$SO_2$—, are prepared by the steps of (a) preparing a perfluoroalkylether diiodide of the formula $I(CF_2)_n(R_f)_m(CF_2)_nI$;

(b) reacting the perfluoroalkylether diiodide with 4-iodobenzil to produce the tetraketone $C_6H_5C(O)C(O)C_6H_4(CF_2)_n(R_f)_m(CF_2)_nC_6H_4C(O)C(O)C_6H_5$; and (c) reacting the resulting tetraketone with a tetraamine of the formula

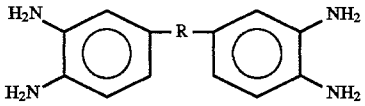

wherein R is a single bond, —O—, —S—, —$C_6H_4O$—$C_6H_4$—, or —$SO_2$—. The perfluoroalkylether-linked quinoxalines can be end-capped with, for example, a low proportion of co-monomers having crosslinking sites such as acetylenic linkages to allow for crosslinking and chain extension on curing.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMERIC PERFLUOROALKYLETHER-LINKED QUINOXALINES

RIGHTS OF THE GOVERNMENT

The invention described herein may be manufactured and used by or for the Government of the United States for all governmental purposes without the payment of any royalty.

BACKGROUND OF THE INVENTION

This invention relates to polymeric perfluoroalkylether-linked quinoxalines.

To increase the efficiency of aircraft engines, operations at very high temperatures are required. Polymeric/elastomeric materials are necessary components of aircraft engines and must be compatible with advanced lubricating fluids, such as perfluoropolyalkylethers and polyphenylethers, in oxidizing atmospheres at elevated temperatures of up to about 330° C. No such elastomers are presently available.

It is an object of the present invention to provide thermally and thermooxidatively stable polymers for elastomer application.

It is another object of the present invention to provide thermally and thermooxidatively stable polymeric perfluoroalkylether-linked quinoxalines.

It is a further object of the present invention to provide a process for synthesizing thermally and thermooxidatively stable polymeric perfluoroalkyletherlinked quinoxalines.

Other objects and advantages of the present invention will be apparent to those skilled in the art.

SUMMARY OF THE INVENTION

In accordance with the present invention there are provided perfluoroalkylether-linked quinoxalines having repeating units of the formula:

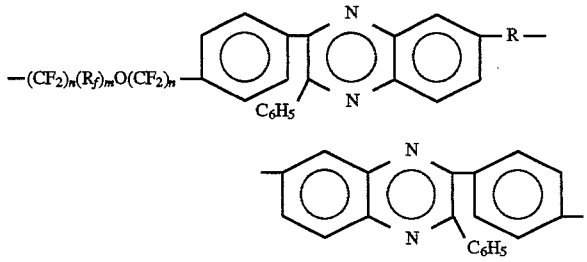

wherein $R_f$ is selected from the group consisting of $—OCF_2CF_2—$, $—OCF_2CF_2CF_2—$, $—OCF_2CF_2CF_2CF_2—$, $—OCF_2CF(CF_3)—$ and $—OCF_2CF_2OCF_2CF(CF_3)—$; wherein n has a value of 2 to 4, and m has a value of 1 to 20; and wherein R is a single bond, —O—, —S—, $—C_6H_4—O—C_6H_4—$, or $—SO_2—$.

DETAILED DESCRIPTION OF THE INVENTION

The perfluoroalkylether-linked quinoxalines of this invention are prepared by the steps of (a) preparing a perfluoroalkylether diiodide of the formula $I(CF_2)_n(R_f)_m(CF_2)_nI$;

(b) reacting the perfluoroalkylether diiodide with 4-iodobenzil to produce the tetraketone $C_6H_5C(O)C(O)C_6H_4(CF_2)_n(R_f)_m(CF_2)_nC_6H_4C(O)C(O)C_6H_5$; and (c) reacting the resulting tetraketone with a tetraamine of the formula

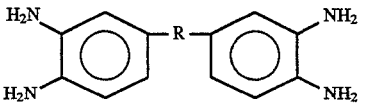

wherein R is a single bond, —O—, —S—, $—C_6H_4—O—C_6H_4—$, or $—SO_2—$, to form the quinoxalines shown previously.

The perfluoroalkylether diiodides are prepared from the corresponding dicarboxylic acids or diesters as shown by the following reaction sequence:

$$HOOC(CF_2)_n(R_f)_m(CF_2)_mCOOH \xrightarrow{Ag_2O} AgOOC(CF_2)_n(R_f)_m(CF_2)_nCOOAg$$

$$AgOOC(CF_2)_n(R_f)_m(CF_2)_nCOOAg \xrightarrow{I_2} I(CF_2)_n(R_f)_m(CF_2)_nI$$

The perfluorodicarboxylic acids and diesters are available from custom research laboratories, such as, for example, Exfluor Research Corporation, PO Box 7807, Austin Tex. 78713. The preparation of the diiodides from the corresponding acids or esters via the silver salts is a standard procedure. A typical procedure is shown in the Examples which follow.

The reaction of the perfluoroalkylether diiodide with 4-iodobenzil is conducted at a temperature of about 90° to 130° C. in a suitable solvent, such as dimethyl sulfoxide (DMSO) or dimethyl formamide (DMF) in the presence of a catalytic amount of a catalyst such as copper bronze powder. The reaction is carried out in vacuo or under an inert gas such as nitrogen, helium or argon, for about 8 to 48 hours. In general, an excess of the 4-iodobenzil is used. Product recovery is shown in the examples which follow. The synthesis of 4-iodobenzil is described by K. J. L. Paciorek, S. R. Masuda, J. G. Shih and J. H. Nakahara, J. Fluorine Chem., vol. 53, pp 233–248 (1991).

The reaction of the tetraketone with the tetraamine is carried out under an inert atmosphere such as nitrogen, helium or argon, in a suitable solvent, such as m-cresol or hexafluoroisopropanol in the presence of a catalytic amount of a lower alkyl, C1 to C4, carboxylic acid. The amount of catalyst used can vary within rather wide limits, but usually ranges from about 0.5 to 10 volume percent of the solvent. Generally, stoichiometric amounts of the reactants will be employed, but one may be present in excess to provide a desired end group for the end-capping process. The reaction is carried out at about 20° to 150° C. for about 4 to 168 hours. The average number of repeating units in the resulting polymer will vary between about 3 and about 50.

The aromatic bis(o-diamines) are well known in the art. Examples of suitable bis(o-diamines) include 3,3',4,4'-tetraaminobiphenyl, 3,3',4,4'-tetraaminodiphenylether, 3,3',4,4'-tetraaminodiphenylsulfide, 3,3',4,4'-tetraaminodiphenylsulfone, and the like.

It will be apparent to those skilled in the art that the process of this invention allows for many useful modifications. One of these is the use of a low proportion of co-monomers having crosslinking sites such as, for example, acetylenic linkages to allow for crosslinking and chain extension on curing. In the case of an excess of the tetraketone, the resulting product may be endcapped with an ethynyl-substituted aromatic ortho-diamine such as, for example, those described by Kovar et al, U.S. Pat. Nos. 3,966,729, 3,975,444 and 4,005,144. The resulting ethynyl-terminated polyquinoxalines can be cured by heating to a temperature of about 200° to 370° C., for about 1 to 24 hours. In the absence of endcapping, depending on the ratio of the tetraamine and tetraketone utilized, the product formed will be functionally terminated either by diamino- or diketo- groups amenable to reaction during curing, for example, of a molded O-ring to the reinforcing resins, among others polyaromatic quinoxalines, having appropriate functionalities. The process and compositions of this invention thus provide wide applications to elastomer technology where extremes of temperature in oxidizing environments are encountered and where tough elastomers are required.

The following examples illustrate the invention:

EXAMPLE I

To a stirred solution of $HO_2CC_3F_6OC_4F_8OC_4F_8OC_3F_6CO_2H$ (14.3 g, 17.1 mmol) in 125 ml water (titrated to a pH of 9.05 with a ca. 2.5M solution of NaOH) was added silver nitrate (8.7 g, 51 mmol, in 9 ml water) at 10° C. over about 10 minutes. A precipitate formed immediately. Stirring was continued for 1 hour. The solution was filtered and the isolated solid was washed with water then transferred to an ampoule and dried in vacuo for 6 hours to give 16.6 g (92% yield) of $AgO_2CC_3F_6OC_4F_8OC_4F_8OC_3F_6CO_2Ag$. Mp>200° C.

EXAMPLE II

Iodine (18.6 g, 73 mmol) was ground to a fine powder and mixed with the silver salt from Example I (7.00 g, 6.65 mmol). The mixture was placed in a reaction tube, then heated at 120° C. for 2 hours under a nitrogen atmosphere, followed by 3 hours at 140° C. After cooling, the material was extracted with Freon-113 (30 ml). Solvent removal in vacuo resulted in 5.88 g (88% yield) of $IC_3F_6OC_4F_8OC_4F_8OC_3F_6I$. Treatment with copper bronze followed by filtration and washing with Freon-113 gave, after solvent removal and distillation, 5.5 g (76% yield) of pure $IC_3F_6OC_4F_8OC_4F_8OC_3F_6I$. b.p. 60°–62° C./0.001 mm Hg. MS (70 ev) m/e (relative intensity, ion): 1002 (74.5%, M), 277 (100%, $CF_2CF_2CF_2I$), 127 (41.4%, I).

EXAMPLE III

In an inert atmosphere enclosure, to a mixture of 4-iodobenzil (7.46 g, 29.8 mmol), copper bronze (5.78 g, 91.0 mmol) and $(IC_3F_6OC_4F_8)_2O$ (13.55 g, 13.5 mmol) was added 13.5 ml of anhydrous dimethylsulfoxide (DMSO). The reaction mixture was stirred at 105°–119° C. for 24 hours under a nitrogen atmosphere. After heating, two layers were present. Analysis by gas chromatography showed a trace of product in the top layer. The bottom layer was 90% product. Dichloromethane (70 ml) was added to the bottom layer, the solution filtered and the remaining DMSO removed by washing with water. Drying with $MgSO_4$ and solvent evaporation, followed by heating in vacuo for 4 hours at 110° C. gave 11.74 g of product. This material was further purified using a silica gel column to give $(C_6H_5COCOC_6H_4C_3F_6OC_4F_8)_2O$ (6.78 g, 43% yield); mp 63°–65° C.; purity 99.5% by gas chromatography; MS (70 eV) m/e (relative intensity, ion): 1061 (5.8%, M - $C_6H_5CO$), 105 (100%, $C_6H_5CO$), 77 (27%, $C_6H_5$).

EXAMPLE IV

In an inert atmosphere enclosure to a stirred solution of $(C_6H_5COCOC_6H_4C_3F_6OC_4F_8)_2O$ (1.0 g, 0.86 mmol) in m-cresol (5 ml) and glacial acetic acid (0.5 g) was added 3,3'-diaminobenzidine (0.16 g, 0.75 mmol) dissolved in warm m-cresol (5 ml) over a period of 25 minutes. After stirring at room temperature for 2 hours was added hexafluoroisopropanol (10 ml). The reaction mixture was stirred at 45°–50° C. for 48 hours. In this reaction, an excess of the benzil monomer was used; accordingly, the reaction product was benzil-terminated. This material was endcapped by the addition of 1,2-phenylenediamine (0.07 g, 0.65 mmol) in 1 ml hexafluoroisopropanol, followed by heating at 45°–50° C. for 67 hours. After removal of half of the solvent, the remaining solution was added dropwise to methanol (50 ml). The precipitated product (1.09 g, 90% yield) was dissolved in hexafluoroisopropanol (4 ml) and reprecipitated into methanol (50 ml), filtered and then dried in vacuo at 95° C. giving:

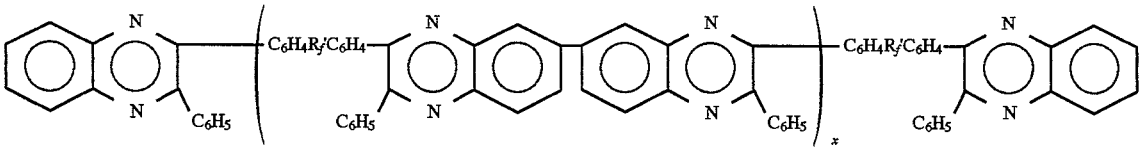

wherein $R_f'$ is $(CF_2)_3O(C_4F_8O)_2(CF_2)_3$, MW 5390 (x=3.7). Thermogravimetric analysis at 10° C./minute showed initial weight loss in nitrogen atmosphere at 395° C. and in air atmosphere at 390° C. Exposure in vacuo at 316° C. for 72 hours resulted in 0.1% volatiles production and quantitative starting material recovery.

EXAMPLE V

In an inert atmosphere enclosure to a stirred solution of $(C_6H_5COCOC_6H_4C_3F_6OC_4F_8)_2O$ (0.9764 g, 0.837 mmol) in hexafluoroisopropanol (7 ml) and glacial acetic acid (0.5 g) was added 3,3'-diaminobenzidine (0.1710 g, 0.798 mmol) dissolved in hexafluoroisopropanol (8 ml) over a period of 40 minutes. After stirring at room temperature for 1 hour, the reaction mixture was stirred at 50°–55° C. for 91 hours. In this reaction, an excess of the benzil monomer was used (1.05:1); accordingly, the reaction product was benzil-terminated. This material was endcapped by the addition of 1,2-phenylenediamine (0.05 g, 0.462 mmol) in 1 ml hexafluoroisopropanol at room temperature, followed by heating at 50°–55° C. for 24 hours. After removal of one-third of the solvent, the remaining solution was added dropwise to methanol (50 ml). The precipitated product (1.08 g) was dissolved in hexafluoroisopropanol (8 ml) and reprecipitated into methanol (50 ml). The light yellow spongy precipitate (1.06 g) was dried in vacuo (<0.001 mm Hg) at 100° C. for 7 hours giving the compound shown in Example IV of MW 13700 (x=10.0). Thermogravimetric analysis at 10° C./minute showed initial weight loss in nitrogen atmosphere at 400° C. and in air atmosphere at 397° C. Exposure in air atmosphere at 316° C. for 24 hours resulted in 0.5% volatiles production. Exposure in air atmosphere at 330° C. for 24 hours resulted in 1.3% volatiles production.

Various modifications may be made in the instant invention without departing from the spirit and scope of the appended claims.

-continued

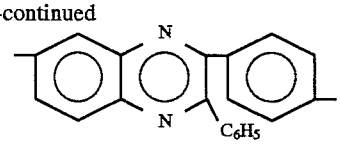

wherein $R_f$ is selected from the group consisting of —$OCF_2CF_2$—, —$OCF_2CF_2CF_2$—, —$OCF_2CF_2CF_2CF_2$—, —$OCF_2CF(CF_3)$— and —$OCF_2CF_2OCF_2CF(CF_3)$—; wherein n has a value of 2 to 4, and m has a value of 1 to 20; and wherein R is a single bond, —O—, —S—, —$C_6H_4O$—$C_6H_4$—, or —$SO_2$—, which comprises the steps of:

(a) preparing a perfluoroalkylether diiodide of the formula $I(CF_2)_n(R_f)_m(CF_2)_nI$;

(b) reacting the perfluoroalkylether diiodide with 4-iodobenzil to produce the tetraketone $C_6H_5C(O)C(O)C_6H_4(CF_2)_n(R_f)_m(CF_2)_nC_6H_4C(O)C(O)C_6H_5$; and (c) reacting the resulting tetraketone with a tetraamine of the formula

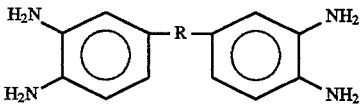

wherein R is as defined above.

2. The process of claim 1 wherein R is a single bond, n is 3, $R_f$ is —$OC_4F_8$ and m is 2.

3. The process of claim 1 further comprising the step of (d) end-capping the reaction product of step (c) .

4. The process of claim 3 wherein an excess of said tetraketone is employed in step (c) and wherein the resulting reaction product is end-capped with 1,2-phenylenediamine to provide a polymer of the formula

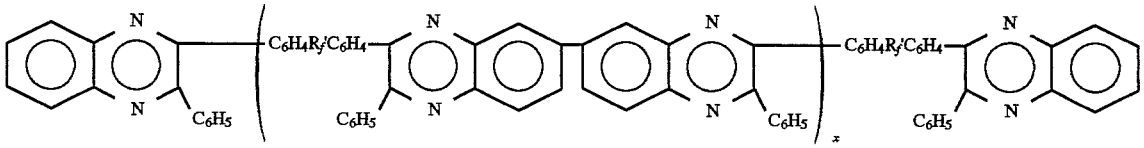

wherein $R_f'$ is —$(CF_2)_n(R_f)_mO(CF_2)_n$—, wherein n is 3, $R_f$ is —$OC_4F_8$— and m is 2, and x has a value between 3 and 50.

5. The process of claim 4 wherein R is a single bond, $R_f'$ is —$(CF_2)_3O(C_4F_8O)_2(CF_2)_3$— and x is 3.7.

6. The process of claim 4 wherein R is a single bond, $R_f'$ is —$(CF_2)_3O(C_4F_8O)_2(CF_2)_3$— and x is 10.0.

7. A perfluoroalkylether-linked quinoxaline having repeating units of the formula:

We claim:

1. A process for preparing a perfluoroalkylether-linked quinoxaline having repeating units of the formula:

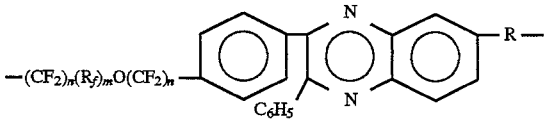

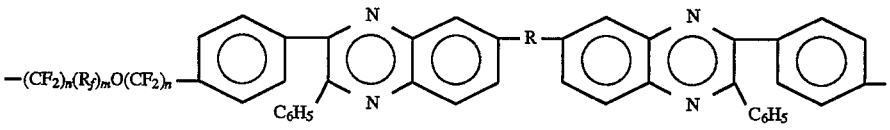

wherein $R_f$ is selected from the group consisting of $—OCF_2CF_2—$, $—OCF_2CF_2CF_2—$, $—OCF_2CF_2CF_2CF_2—$, $—OCF_2CF(CF_3)—$ and $—OCF_2CF_2OCF_2CF(CF_3)—$; wherein n has a value of 2 to 4, and m has a value of 1 to 20; and wherein R is a single bond, —O—, —S—, $—C_6H_4—O—C_6H_4—$, or $—SO_2—$.

8. The perfluoroalkylether-linked quinoxaline of claim 7 wherein R is a single bond, n is 3, $R_f$ is $—OC_4F_8—$ and m is 2.

9. The perfluoroalkylether-linked quinoxaline of claim 8 wherein the average number of repeating units is 3.7.

10. The perfluoroalkylether-linked quinoxaline of claim 8 wherein the average number of repeating units is 10.0.

11. The tetraketone $C_6H_5C(O)C(O)C_6H_4(CF_2)_n(R_f)_m(CF_2)_nC_6H_4C(O)C(O)C_6H_5$ wherein $R_f$ is selected from the group consisting of $—OCF_2CF_2—$, $—OCF_2CF_2CF_2—$, $—OCF_2CF_2CF_2CF_2—$, $—OCF_2CF(CF_3)—$ and $—OCF_2CF_2OCF_2CF(CF_3)—$; wherein n has a value of 2 to 4; and wherein m has a value of 1 to 20.

12. The tetraketone of claim 11 wherein n is 3, $R_f$ is $—OC_4F_8—$ and m is 2.

* * * * *